(12) United States Patent
Nomura (10) Patent No.: US 7,693,658 B2
(45) Date of Patent: Apr. 6, 2010

(54) NAVIGATION APPARATUS

(75) Inventor: Takashi Nomura, Zama (JP)

(73) Assignee: Xanavi Informatics Corporation, Zama-shi (JP)

(*) Notice: Subject to any disclaimer, the term of this patent is extended or adjusted under 35 U.S.C. 154(b) by 496 days.

(21) Appl. No.: 11/516,796

(22) Filed: Sep. 7, 2006

(65) Prior Publication Data

US 2007/0057948 A1 Mar. 15, 2007

(30) Foreign Application Priority Data

Sep. 8, 2005 (JP) ............................. 2005-260409

(51) Int. Cl.
*G06F 19/00* (2006.01)
*G01C 21/00* (2006.01)

(52) U.S. Cl. ...................... 701/211; 701/209; 340/995; 340/990

(58) Field of Classification Search ................. 701/211, 701/200, 208, 209; 340/995, 427, 990; 345/427, 345/853
See application file for complete search history.

(56) References Cited

U.S. PATENT DOCUMENTS 6,141,014 A * 10/2000 Endo et al. ................. 345/427
6,268,490 B1 * 7/2001 Imanishi et al. ............ 536/23.1
6,360,168 B1 * 3/2002 Shimabara .................. 701/211

FOREIGN PATENT DOCUMENTS

JP 2001-56823 A 2/2001

* cited by examiner

*Primary Examiner*—Khoi H. Tran
*Assistant Examiner*—Ronnie Mancho
(74) *Attorney, Agent, or Firm*—Crowell & Moring LLP (57) ABSTRACT

A navigation apparatus includes a display control unit that displays a roadmap by using road data and an intersection arrangement at an intersection by using the intersection arrangement data. The intersection arrangement data include intersection coordinate data containing coordinate information corresponding to an intersection as well as display data used to display an intersection arrangement at an intersection. When approaching a specific intersection on the roadmap, the display control unit makes a decision as to whether or not the intersection coordinate data include coordinate information corresponding to coordinate information for the specific intersection on the roadmap, and if the intersection coordinate data are determined to include coordinate information corresponding to the coordinate information for the specific intersection, the display control unit judges that the road data and the intersection arrangement data match up, and displays the intersection arrangement at the specific intersection by using the intersection arrangement data.

11 Claims, 10 Drawing Sheets

| | DATA NAME | |
|---|---|---|
| LINK STRING 1 | LINK STRING INFORMATION | LINK STRING SIZE |
| | | NUMBER OF MAKEUP POINTS |
| | | LINK ATTRIBUTES |
| | | ROAD NAME OFFSET |
| | | ROUTE NUMBER |
| | | |
| | NODE LINK INFORMATION | ATTRIBUTE 1 + X COORDINATE |
| | | ATTRIBUTE 2 + Y COORDINATE |
| | | (SAME NODE OFFSET) |
| | | (GUIDANCE OFFSET) |
| | | (LINK NUMBER) |
| | | : |
| | | ATTRIBUTE 1 + X COORDINATE |
| | | ATTRIBUTE 2 + Y COORDINATE |
| | | (SAME NODE OFFSET) |
| | | (GUIDANCE OFFSET) |
| | | (LINK NUMBER) |
| | | (HEIGHT INFORMATION) |
| | | : |
| | | (HEIGHT INFORMATION) |
| : | | |
| LINK STRING n | | LINK STRING INFORMATION |
| | | NODE · LINK INFORMATION |

NAVIGATION APPARATUS

INCORPORATION BY REFERENCE

The disclosure of the following priority application is herein incorporated by reference:

Japanese Patent Application No. 2005-260409 filed Sep. 8, 2005

BACKGROUND OF THE INVENTION

1. Field of the Invention

The present invention relates to a navigation apparatus.

2. Description of the Related Art

There is a technology adopted in a car navigation apparatus in the related art, whereby a map is divided into a plurality of units, map data files are created each in correspondence to one of the units and the map data files are updated in correspondence to the individual units (see Japanese Laid Open Patent Publication No. 2001-56823). There is a car navigation apparatus also known in the related art that provides a detailed three-dimensional display of the arrangement of an intersection.

SUMMARY OF THE INVENTION

In a navigation apparatus that provides a detailed three-dimensional display of the arrangement of an intersection, the data used to three dimensionally display the intersection arrangement in detail should be updated independently of the data used to display a roadmap. Such a navigation apparatus also needs to adopt a system that maintains continuity between the data used to three dimensionally display the details of the intersection arrangement and the data used to display the roadmap, which are ideally updated independently of each other.

The present invention provides a navigation apparatus that manages road data used to display a roadmap and data used to display the intersection arrangement in coordination with each other.

According to the 1st aspect of the present invention, a navigation apparatus comprises: a road data-obtaining unit that obtains road data containing coordinate information for an intersection and used to display a roadmap; an intersection arrangement data-obtaining unit that obtains intersection arrangement data adopting a data structure that enables an update thereof to be executed independently of the road data and used to display an intersection arrangement at an intersection in a display mode different from a display mode adopted for the roadmap; and a display control unit that displays at a display unit the roadmap by using the road data obtained by the road data-obtaining unit and displays an intersection arrangement at an intersection on the roadmap by using the intersection arrangement data obtained by the intersection arrangement data-obtaining unit, and: the intersection arrangement data include intersection coordinate data containing coordinate information corresponding to an intersection as well as display data used to display an intersection arrangement at an intersection; when approaching a specific intersection on the roadmap, the display control unit makes a decision as to whether or not the intersection coordinate data include coordinate information corresponding to coordinate information for the specific intersection on the roadmap; and if the intersection coordinate data are determined to include coordinate information corresponding to the coordinate information for the specific intersection on the roadmap, the display control unit judges that the road data and the intersection arrangement data match up, and displays the intersection arrangement at the specific intersection by using the intersection arrangement data.

According to the 2nd aspect of the present invention, in the navigation apparatus according to the 1st aspect it is preferred that: the intersection coordinate data further include specific distance point coordinate information for a point on a road extending from an intersection present at a predetermined distance from the intersection, in addition to coordinate information corresponding to the intersection; the display control unit calculates coordinates of a point on a road extending from the specific intersection present at the predetermined distance from the specific intersection on the roadmap by using the road data and makes a decision as to whether or not the intersection coordinate data include specific distance point coordinate information corresponding to the calculated coordinates; and if the intersection coordinate data are determined to include the specific distance point coordinate information corresponding to the calculated coordinates, the display control unit judges that the road data and the intersection arrangement data match up and displays the intersection arrangement at the specific intersection by using the intersection arrangement data.

According to the 3rd aspect of the present invention, in the navigation apparatus according to the 2nd aspect it is preferred that the display control unit calculates coordinates of points on a plurality of roads extending from the specific intersection present at the predetermined distance from the specific intersection by using the road data and makes a decision as to whether or not the intersection coordinate data include a plurality of sets of specific distance point coordinate information corresponding to the plurality of coordinates having been calculated.

According to the 4th aspect of the present invention, in the navigation apparatus according to the 1st aspect it is preferred that upon judging that the road data and the intersection arrangement data do not match up, the display control unit displays a message indicating a mismatch between the road data and the intersection arrangement data and does not display the intersection arrangement at the specific intersection by using the intersection arrangement data.

According to the 5th aspect of the present invention, in the navigation apparatus according to the 2nd aspect it is preferred that upon judging that the road data and the intersection arrangement data do not match up, the display control unit displays a message indicating a mismatch between the road data and the intersection arrangement data and does not display the intersection arrangement at the specific intersection by using the intersection arrangement data.

According to the 6th aspect of the present invention, in the navigation apparatus according to the 3rd aspect it is preferred that upon judging that the road data and the intersection arrangement data do not match up, the display control unit displays a message indicating a mismatch between the road data and the intersection arrangement data and does not display the intersection arrangement at the specific intersection by using the intersection arrangement data.

According to the 7th aspect of the present invention, in the navigation apparatus according to the 1st aspect it is preferred that the intersection arrangement data are data used to display the intersection arrangement as a three-dimensional dynamic image.

According to the 8th aspect of the present invention, in the navigation apparatus according to the 1st aspect it is preferred that the intersection arrangement data are intersection enlargement data used to display the intersection arrangement in detail.

According to the 9th aspect of the present invention, in the navigation apparatus according to the 1st aspect it is preferred that the intersection arrangement data are branch guidance data used to display in detail conditions at a branching point at an express highway.

According to the 10th aspect of the present invention, a computer-readable computer data product comprises a recording medium having recorded therein the intersection arrangement data to be obtained by a navigation apparatus according to the 1st aspect.

BRIEF DESCRIPTION OF THE DRAWINGS

FIG. 11 shows how the program may be provided to a personal computer in a recording medium such as a CD-ROM or via a data signal on the Internet or the like.

DESCRIPTION OF PREFERRED EMBODIMENT

Figure 1:
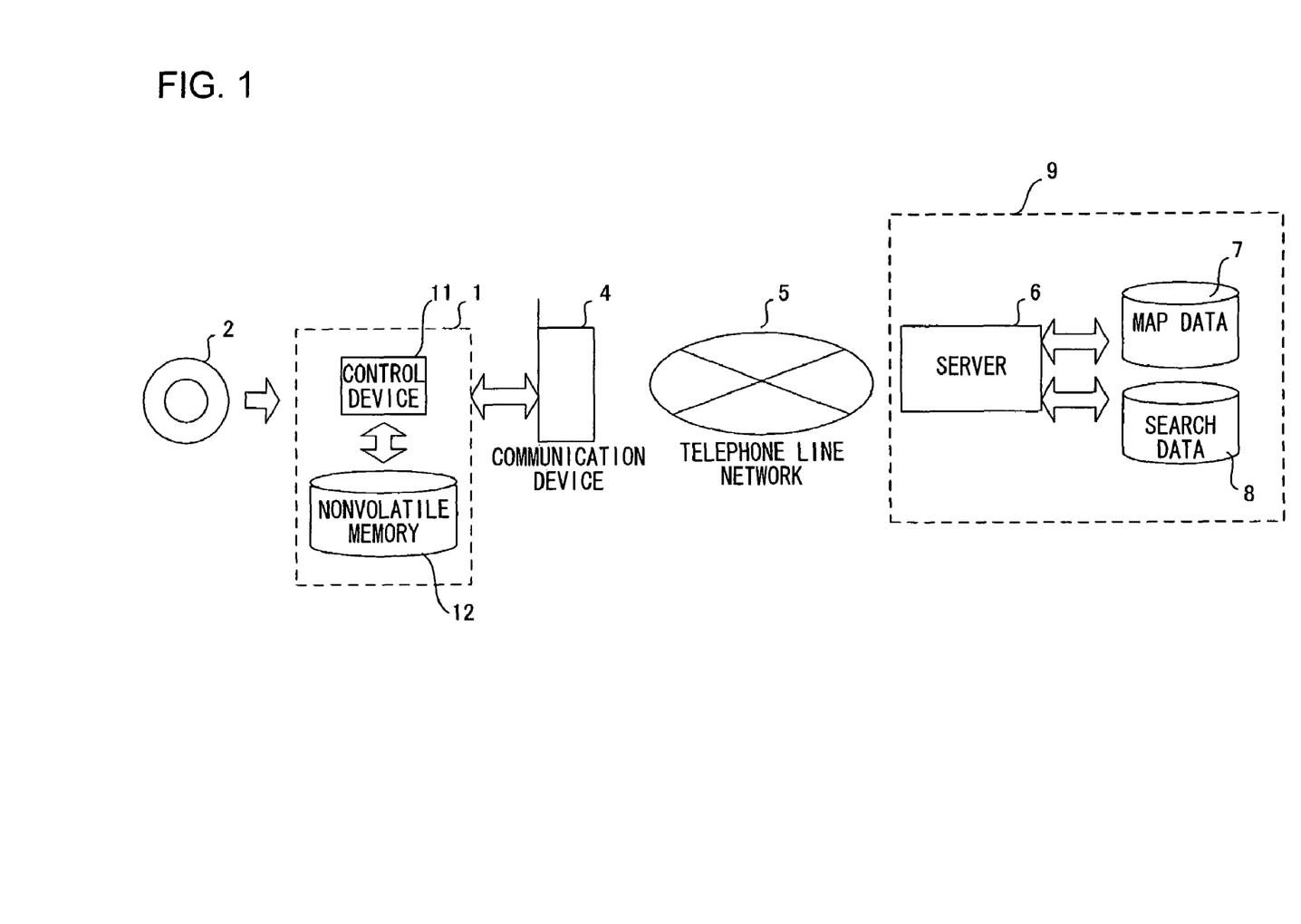
FIG. 1 shows a map data update system adopted to update map data used in a navigation apparatus, as achieved in an embodiment of the present invention.

FIG. 8 shows an update system with which map data used in a navigation apparatus are updated, as achieved in an embodiment of the present invention. An on-vehicle navigation apparatus 1 reads map data, search data (guidance search data) and the like from a recording medium 2 such as a CD-ROM or a DVD-ROM. A server 6 at a data provider center 9 reads map data and search data respectively from a map database 7 and a search database 8 and provides update data to be used to update map data and search data to the navigation apparatus.

The navigation apparatus 1 in the embodiment maintains coordination between road data and real 3-D data constituting part of the map data when the road data or the real 3-D data are updated.

The navigation apparatus 1 is able to connect with a communication device 4 such as a portable telephone. The navigation apparatus 1 is also able to connect with a telephone network 5 via the communication device 4 and then connect with the server 6 via the telephone network 5. The server 6 saves in the map database 7 map data including older versions of map data and the latest version of map data and also saves in the search database 8 search data including older versions of search data and the latest version of search data. Thus, the server 6 is able to provide the navigation apparatus 1 with update data to be used to update part of the map data or the search data via the telephone network 5.

The navigation apparatus 1 includes a control device 11 and a nonvolatile memory 12. The control device 11 is constituted with a microprocessor and its peripheral circuits. The nonvolatile memory 12 is a hard disk or a flash memory built into the navigation apparatus 1. The nonvolatile memory 12 may be any type of storage device as long as data written therein are not lost when the power to the navigation apparatus 1 is turned off.

The map database 7 and the search database 8 at the data provider center 9, which hold all the versions of map data and search data to date, are mother databases. Data at the map database 7 or the search database 8 may be used by the server 6 to prepare the recording medium 2 having recorded therein the initial (pre-update) map data or search data.

Figure 2:
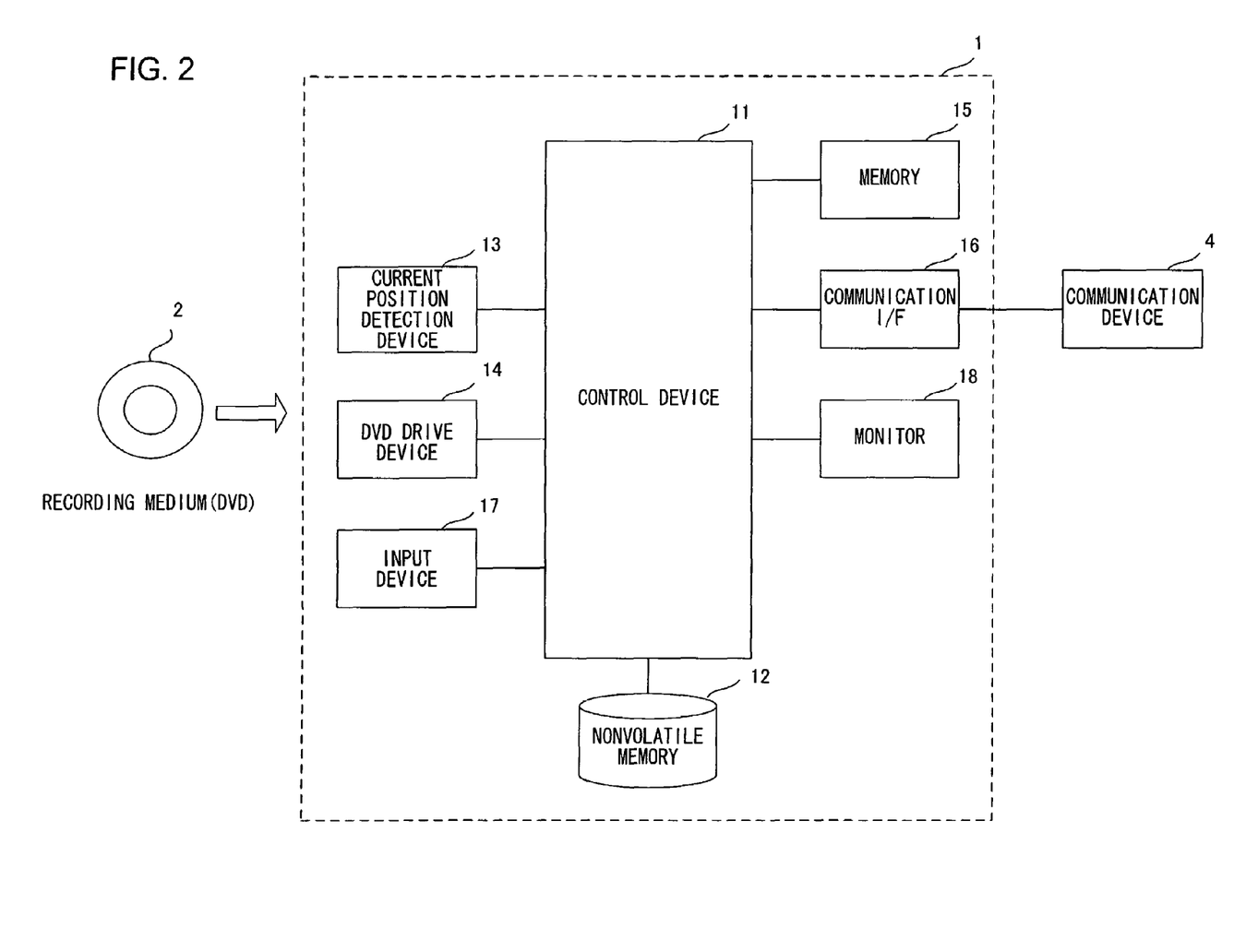
FIG. 2 is a block diagram of the navigation apparatus 1.

FIG. 2 is a block diagram of the on-vehicle navigation apparatus 1. The navigation apparatus 1 comprises the control device 11, the nonvolatile memory 12, a current position detection device 13, a DVD drive device 14, a memory 15, a communication interface 16, an input device 17, a monitor 18 and the like.

The current position detection device 13, which detects the current position of the vehicle, may be constituted with an azimuth sensor that detects the advancing azimuth of the vehicle, a vehicle speed sensor that detects the vehicle speed, a GPS sensor that detects a GPS signal from a GPS (Global Positioning System) satellite and the like. The DVD drive device 14 reads map data and the like from a recording medium 2 loaded therein. The recording medium 2 in the embodiment is a DVD-ROM. However, it may be another type of recording medium such as a CD-ROM.

In the memory 15, vehicle position information indicating the vehicle position detected by the current position detection device 13, node information and link information with regard to the nodes and the links present on a recommended route calculated by the control device 11, and the like are stored. The memory 15 is used as a working area by the control device 11. The communication interface 16 is an interface that connects the navigation apparatus with the communication device 4. The use of the portable telephone and the connection with the Internet are enabled via the communication interface 16.

At the monitor 18, a map, the recommended route and various types of information are displayed. The monitor 18 may be provided as an integrated part of the navigation apparatus main unit or it may be provided as a stand-alone unit in a separate frame. In addition, the monitor 18 alone may be installed at a remote location and connected with the navigation apparatus main unit via a cable or the like. The input device 17 is used to input a destination for the vehicle and the like for a route search. It is also used to enter a search key. The input device may be a remote-control unit or it may be constituted with a touch panel disposed on the screen of the monitor 18.

The control device 11 executes various types of navigation processing such as road map display, route calculation (route search) and route guidance by using the current vehicle position information detected with the current position detection device 13, the map data and the search data stored in the recording medium 2 or the nonvolatile memory 12 and the like. It is to be noted that a program of the various types of processing executed by the control device 11 is installed in a ROM (not shown) provided inside the control device 11.

The server 6 at the data provider center 9 is a computer system that executes various types of processing including update data distribution, by using the data in the map database 7 and the search database 8. The computer system at the server 6 may be constituted with any type of computer, e.g., a general-purpose computer, a workstation or a personal computer.

The map data used in the navigation apparatus 1 are now explained.

-Map Data-

The map data are information related to maps and include various types of data, such as road data (map display data, locator data) data, route search data (network data) and route guidance data (information indicating intersection names, road names and directional terms, directional guidance facility information and the like). The map data in the embodiment also include real 3-D data.

The road data are used to display roads and road maps and to specify a vehicle position (current vehicle position) on a road, for map matching, and the like. The route search data, which are data constituted with branching information and the like not directly relevant to the specific road shapes, are mainly used when calculating a recommended route (when executing a route search). The route guidance data include the names of intersections and the like, and are used to provide guidance for the driver or the like along the recommended route having been calculated.

The range of the road map display (e.g., the entire nation of Japan) is divided into mesh areas (grids) and the map data are thus managed in units of individual meshes in the embodiment. Namely, the road data, the route search data, the route guidance data and the real 3-D data are all provided as data files each corresponding to one of the meshes. As the data are updated in units of individual data files, the road data, the route search data, the route guidance data and the real 3-D data can be updated in units of individual meshes.

The server 6 at the data provider center 9 provides update data to be used to update road data, route search data, route guidance data or real 3-D data managed in units of individual files each corresponding to a mesh to the navigation system 1 via a telephone network 5. The navigation apparatus 1 updates the data undergoing the update by overwriting them with the update data in units of individual files.

-Road Data-

The road data are link string data that express roads with links, nodes and link strings. The term "node" is used to refer to an intersection or a special point specified on a road. A link is equivalent to a road portion connecting nodes, which may be regarded as a road unit defined in the road data. A link is defined so as to include nodes each present at one of the two ends, whereas a link string is a string of links representing a single road.

Figure 3:
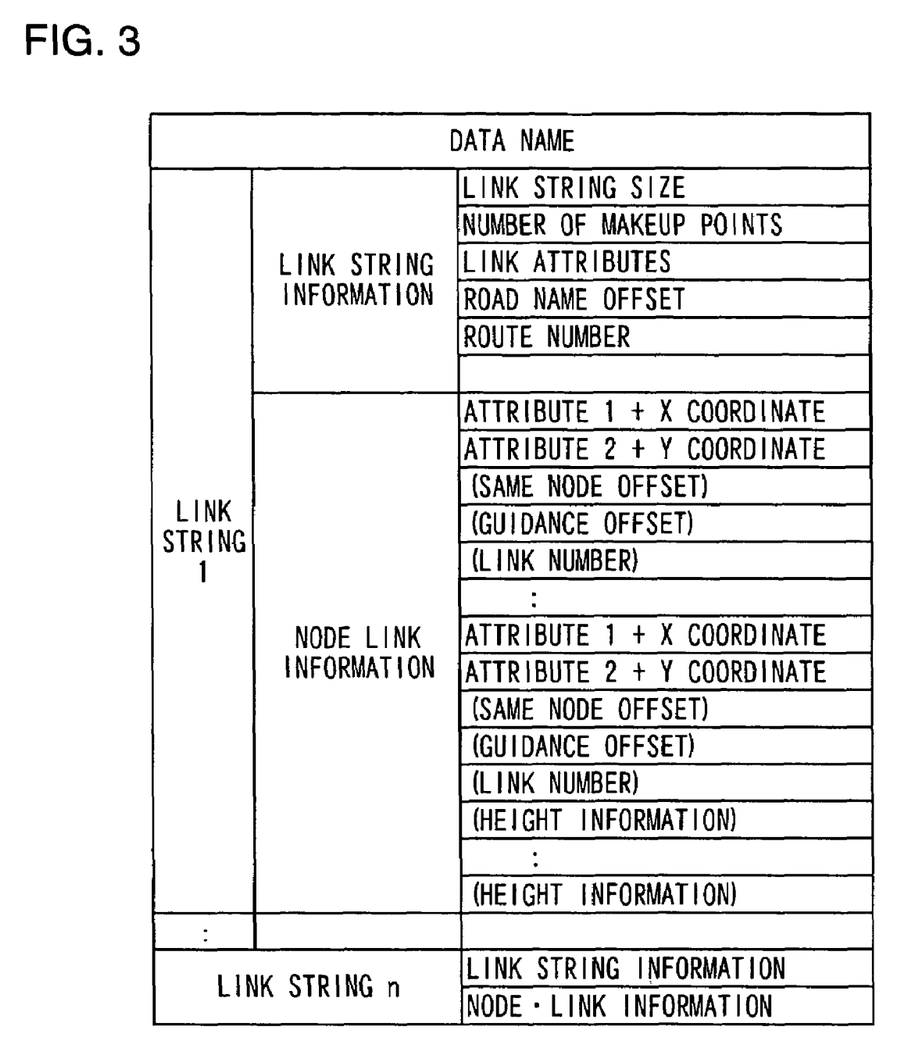
FIG. 3 presents an example of a data structure that may be adopted in the road data.

FIG. 3 presents an example of a data structure that may be adopted in the road data. As shown in FIG. 3, the road data include a plurality of sets of link string data containing various types of information related to link strings 1 to n, with each set of link string data compiled in correspondence to a specific link string. Each set of link string data includes link string information and node link information. The link string information includes data indicating the link string size, the number of makeup points, the link attributes, the road name offset, the route number and the like. The node link information includes data for each node indicating the attribute 1+X coordinate, the attribute 2+Y coordinate, the same node offset, the guidance offset, the link number, the height and the like.

The guidance offset data indicate the address at which the route guidance data for the corresponding node can be referenced. The route guidance data include intersection name data, road name data, directional term data, directional guidance facility information and the like to be used in route guidance, in correspondence to each node. The route guidance data in the embodiment also include a flag indicating whether or not real 3-D data are available in correspondence to each node.

The X coordinate data and the Y coordinate data indicated in the node link information indicate the coordinates of each of the nodes constituting the link string. If a given node is set at an intersection, the X coordinate data and the Y coordinate data indicate the coordinates of the particular intersection.

The road data are constituted with information related to links and nodes as described above. Since the details of link string data are of the known art, they are not described in detail in this specification.

-Real 3-D Data-

The real 3-D data are used to bring up a realistic 3-D dynamic image display of the intersection arrangement. The intersection arrangement may be referred to as the intersection scene, the intersection view, the intersection state, the intersection conditions or the like. The real 3-D data are generated based upon data obtained by capturing an image of the actual intersection with a video camera or the like. With such real 3-D data, a realistic three-dimensional display of the arrangement at the actual intersection is enabled. They are generated so as to enable a dynamic image display whereby the image changes as the vehicle advances.

The arrangement of the intersection is displayed by using real 3-D data so as to bring up a realistic 3-D display of the intersection as described above in a display mode different from that adopted when displaying a road map based upon the road data. The roadmap is displayed based upon the road data as a plan view map by using the data related to the nodes and the links, or a bird's eye view map, i.e., a view of the plan view map taken from a predetermined height. The bird's eye view data may be obtained by executing a predetermined type of coordinate conversion on the data related to the nodes and the links used to display the plan view map.

Figure 4:
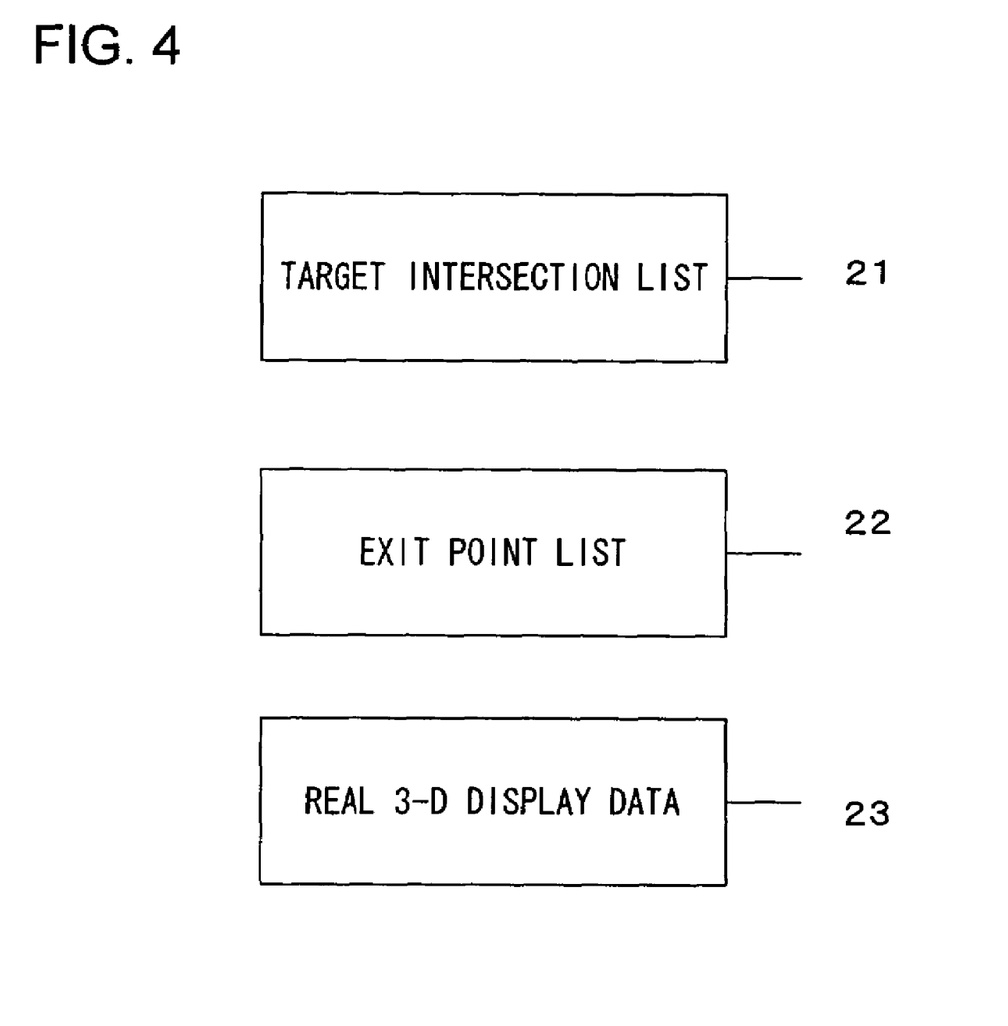
FIG. 4 shows the data structure per mesh adopted in real 3-D data.

FIG. 4 shows the data structure per mesh adopted in real 3-D data in the embodiment. A set of real 3-D data per mesh is constituted with target intersection list data 21, exit point list data 22 and real 3-D display data 23. As described earlier, the real 3-D data are managed in units of individual meshes and thus, a set of target intersection list data and a set of exit point list data 22 are generated in correspondence to each mesh.

It is to be noted that since the real 3-D data are provided as files each corresponding to a specific mesh, independently of the road data, the route search data and the route guidance data, the real 3-D data can be updated in units of individual meshes independently of other types of data.

Figure 5:
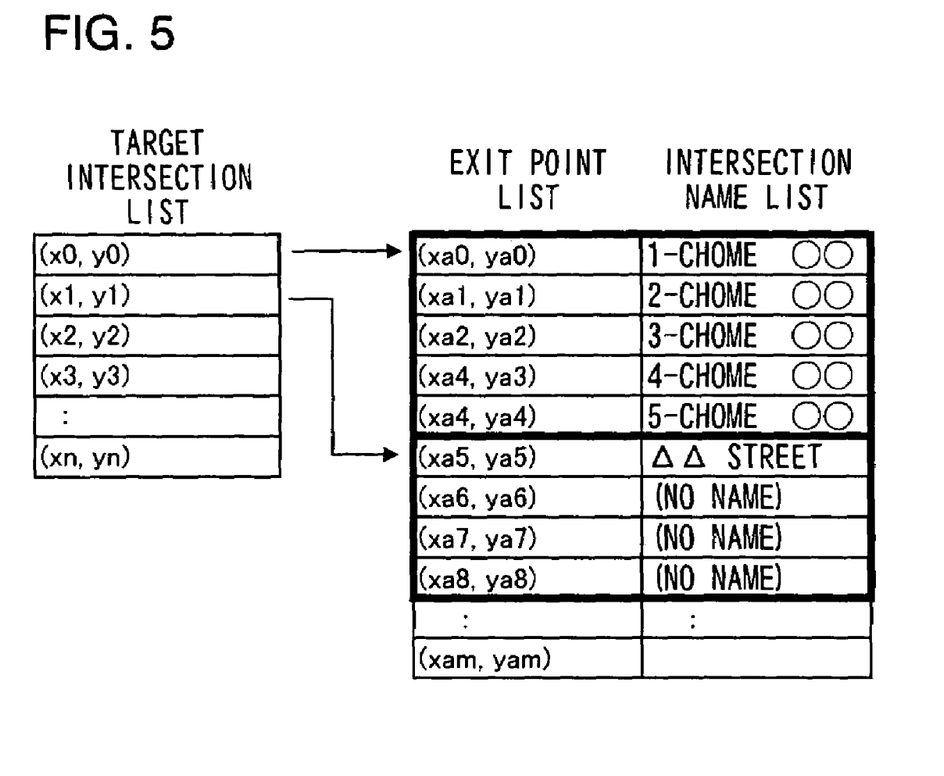
FIG. 5 shows the target intersection list data 21 and the exit point list data 22.

FIG. 5 shows the target intersection list data 21 and the exit point list data 22. The target intersection list data 21 are provided as a table of coordinate data for intersections in the corresponding mesh, for which real 3-D display data 23 are available (these intersections are referred to as target intersections in the description of the embodiment). Together with each set of coordinate data, data indicating the corresponding access address (not shown) within the real 3-D display data 23 are stored in the target intersection list data 21. The real 3-D display data 23 corresponding to a specific intersection can be obtained based upon the access address. The example in FIG. 5 indicates that the real 3-D display data 23 are available for n intersections located at coordinates $(x_0, y_0)$ to coordinates $(x_n, y_n)$.

As the exit point list data 22, the coordinates of a point on each road extending from a target intersection, i.e., each road connecting to the target intersection, which is at a predetermined distance from the target intersection, (the point is referred to as an exit point in the description of the embodiment), are stored in correspondence to each target intersection. In correspondence to each exit point, data indicating the name of the target intersection assumed on the exit point side are stored as intersection name list data. Different intersection names may be assumed to refer to a single intersection depending upon the approaching direction, and thus, the intersection name list data for various exit points of a given intersection may indicate different names. If the intersection does not have a name assumed on the side of a particular exit point, the corresponding intersection name data will be blank data. The exit point list data 22 are stored as a table.

Figure 6:
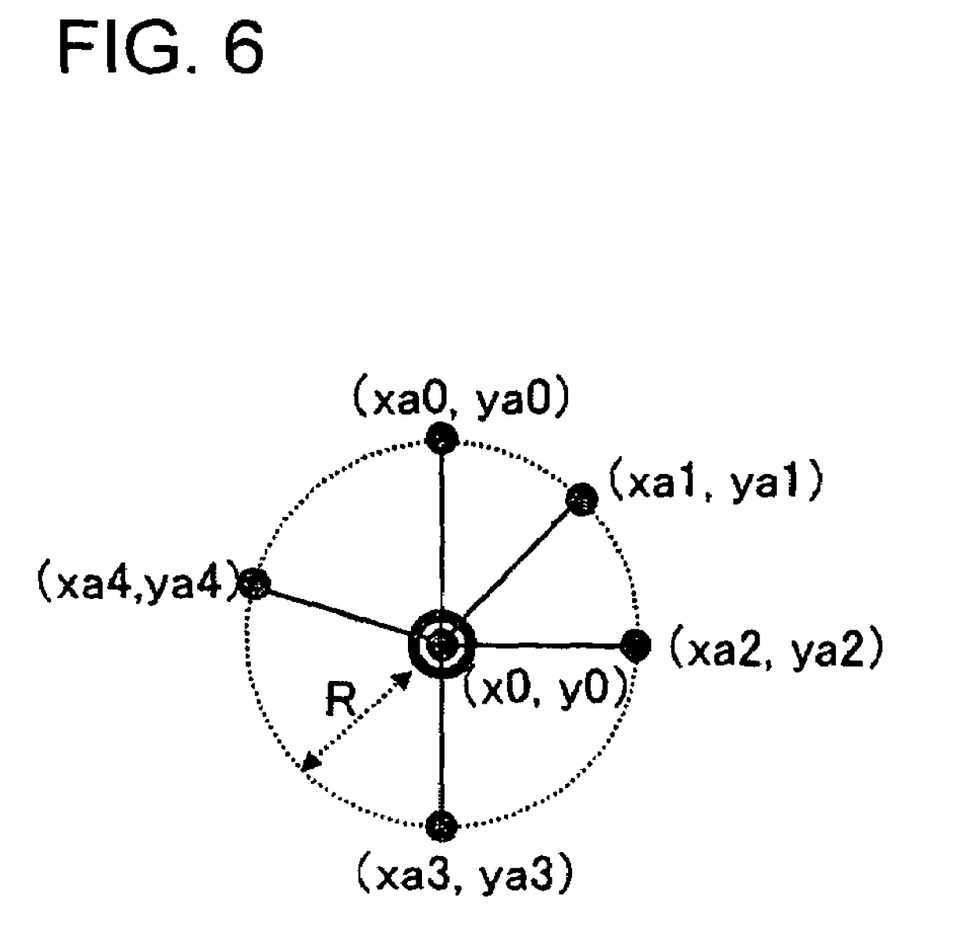
FIG. 6 illustrates exit points at a given target intersection.

FIG. 6 shows exit points of a given target intersection. In the example presented in FIG. 6, points on the individual road extending from the target intersection, which are present on the circumference of a circle with a radius R matching a specific linear distance R from the target intersection, are designated as exit points. In the example presented in FIG. 6, five exit points with coordinates (xa0, ya0), coordinates (xa1, ya1), coordinates (xa2, ya2), coordinates (xa3, ya3) and coordinates (xa4, ya4) are present around the target intersection assuming positional coordinates (x0, y0). The radius R may be set to, for instance, 100 m. However, it is simply an example and any value other than 100 m, e.g., 50 m, may be set for the radius R.

-Route Guidance Processing-

Figure 7:
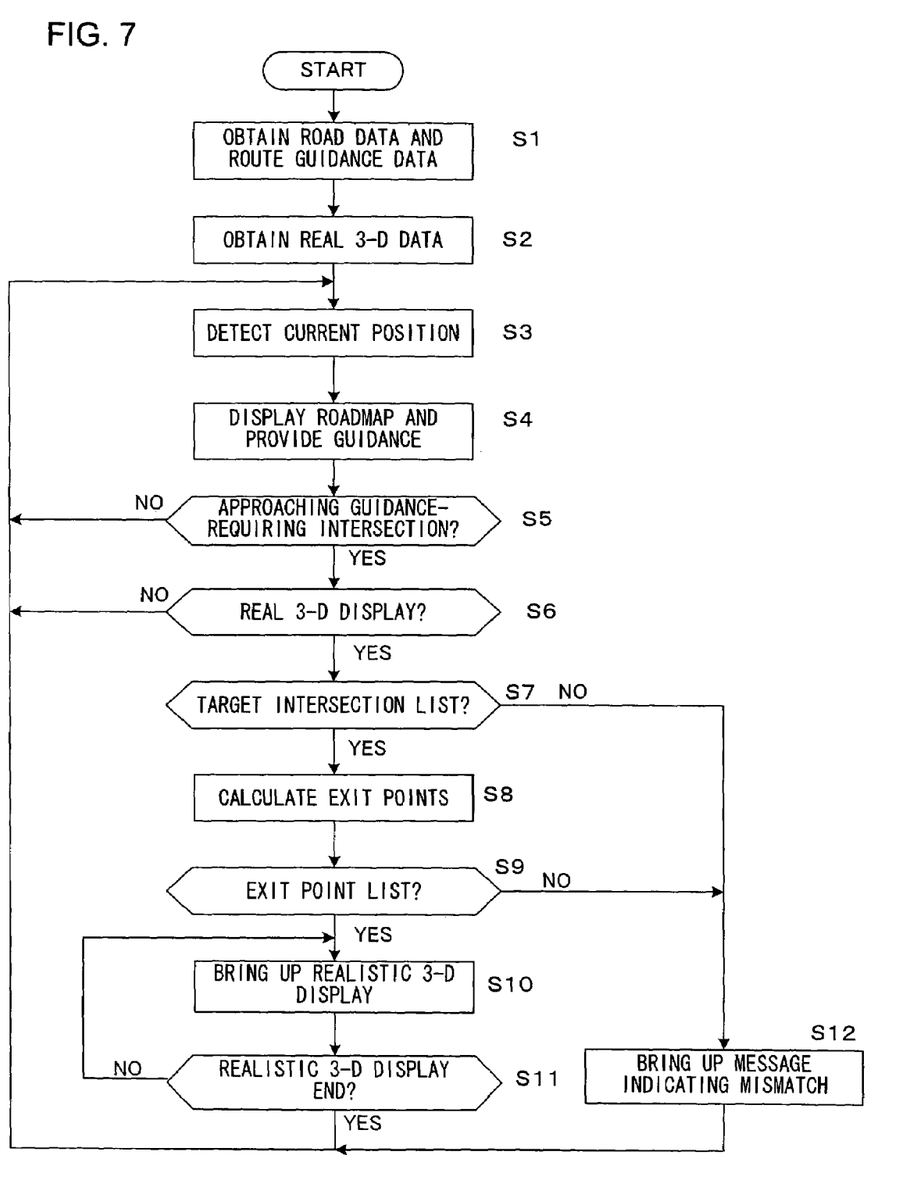
FIG. 7 presents a flowchart of the route guidance processing executed in the navigation apparatus 1.

FIG. 7 presents a flowchart of the route guidance processing executed in the navigation apparatus 1 in the embodiment. As the vehicle being guided along the route approaches a guidance-requiring intersection for which real 3-D data are available, a realistic three-dimensional display of the arrangement of the guidance-requiring intersection is brought up on display by using the real 3-D data in the embodiment. By the time the processing in the flowchart presented in FIG. 7 starts, a route search for a route from a start point (vehicle current position) to a destination, executed by using the route search data, will have been completed, recommended route data corresponding to the recommended route resulting from the search will have been generated and route guidance along the recommended route resulting from the search is underway. The processing in FIG. 7 is executed by the control device 11.

In step S1, the road data and the route guidance data are read out from the recording medium 2 loaded in the DVD drive device 14. In step S2, the real 3-D data are likewise read out from the recording medium 2. It is to be noted that while the road data, the route guidance data and the real 3-D data are obtained in steps S1 and S2 in the description so as to facilitate the explanation, it should be understood that they are also read out subsequently whenever they are needed after step S3, as the vehicle travels on.

In step S3, the current vehicle position is detected by the current vehicle position detection device 13. In step S4, Route guidance is provided with the roadmap of an area around the current vehicle position displayed on the monitor 16. The recommended route selected in advance should be indicated in a color (e.g., pink) different from the color used for the other roads and the roadmap includes a current vehicle position mark, as well.

In step S5, a decision is made as to whether or not the vehicle is now approaching a guidance-requiring intersection. If it is decided that the vehicle is not close to a guidance-requiring intersection, the operation returns to step S3 to execute the processing repeatedly. If, on the other hand, it is decided that the vehicle is now approaching a guidance-requiring intersection, the operation proceeds to step S6. In step S6, a decision is made as to whether or not real 3-D data are available for the guidance-requiring intersection by referencing the route guidance data corresponding to the particular guidance-requiring intersection. If it is decided that there are no real 3-D data available in correspondence to the guidance-requiring intersection, the operation returns to step S3 to repeatedly execute the standard route guidance processing. If, on the other hand, it is decided that there are real 3-D data available for the guidance-requiring intersection, the operation proceeds to step S7.

In step S7, a decision is made as to whether or not the target intersection list data 21 include coordinate data corresponding to the coordinates of the guidance-requiring intersection. The coordinates of the guidance-requiring intersection may be extracted from the road data which include the coordinate data for the node corresponding to the guidance-requiring intersection. Alternatively, since the recommended route data also contain coordinate data for the individual nodes present on the recommended route, the coordinates of the guidance-requiring intersection may be extracted from the recommended route data.

It is a prerequisite that the road data, the route search data and the route guidance data used in the embodiment match up with one another before and after a data update. Accordingly, the coordinates of the guidance-requiring intersection may be obtained from any of these data.

If it is decided in step S7 that the target intersection list data 21 include coordinate data corresponding to the coordinates of the guidance-requiring intersection, the operation proceeds to step S8, but the operation proceeds to step S12 otherwise. In step S8, exit points on the roadmap are calculated.

Figure 8:
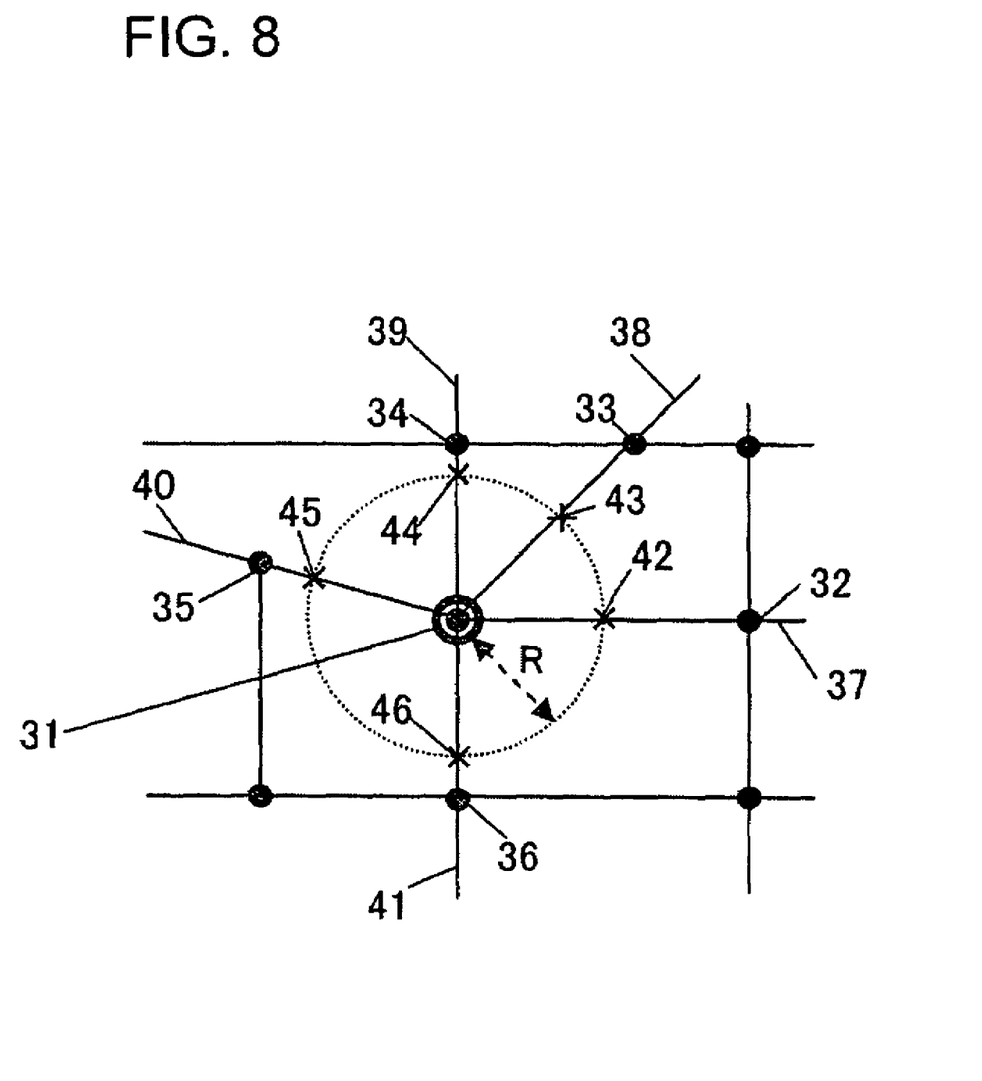
FIG. 8 illustrates how exit points on the roadmap may be calculated.

FIG. 8 illustrates how exit points on the roadmap may be calculated. FIG. 8 shows a roadmap of an area around a guidance-requiring intersection 31 generated based upon the road data. This roadmap corresponds to the roadmap displayed at the monitor 16. The roadmap shows roads 37 to 41 extending from the guidance-requiring intersection 31 to nodes 32 to 36 respectively. The control device 11 calculates the coordinates of exit points 42 to 46 on the roads 37 to 41, which are present on the circumference of a circle with a radius R m around the guidance-requiring intersection 31. The radius R assumes the same value as that assumed for the radius R in FIG. 6. The road data contain the coordinate data for the guidance-requiring intersection 31 and the nodes 32 to 36, and the coordinates of the exit points 42 to 46 can be calculated by using these coordinate data.

In step S9, a decision is made as to whether or not the exit point list data 22 include coordinate data corresponding to the exit point coordinates having been calculated as described above. If it is decided that the exit point list data 22 include coordinate data corresponding to the exit point coordinates having been calculated, the operation proceeds to step S10, but the operation proceeds to step S12 otherwise.

In step S10, a realistic 3-D display of the guidance-requiring intersection is brought up on display by using the real 3-D display data 23. The real 3-D display data 23 are accessed based upon the address of the real 3-D display data for the particular intersection, which is indicated in the target intersection list data 21. In step S11, a decision is made as to whether or not the realistic 3-D display has ended. If it is decided that the realistic 3-D display has not yet ended, the operation returns to step S10 to repeat the realistic 3-D display. If, on the other hand, it is decided that the realistic 3-D display has ended, the operation returns to step S3 to resume the regular route guidance.

An affirmative decision may be made in step S7 or step S9 even if the coordinate data included in the target intersection list data 21 or the exit point list data 22 do not exactly match the intersection coordinates or the exit point coordinates. In other words, decisions should be made in step S7 and step S9 by allowing for a certain degree of error.

In step S12, a message indicating a mismatch between the road data and the real 3-D data is brought up on display and then the operation returns to step S3. The operation proceeds to step S12, having assumed in step S6 that real 3-D data corresponding to the target intersection are available. In other words, while there are real 3-D data corresponding to the target intersection, the road data and the real 3-D data have not matched up with each other and accordingly, a mismatch between the road data and the real 3-D data is indicated. Unless the real 3-D data match up with the road data, the realistic 3-D display of the intersection is not brought up by using the real 3-D data.

The following advantages are achieved by using the navigation apparatus 1 described above.

(1) The road data used to display a roadmap and the real 3-D data used to bring up a realistic display of the intersection arrangement can be managed in accurate coordination with each other.
(2) If the road data and the real 3-D data do not match up, the realistic 3-D display is not brought up by using the mismatched data. In other words, the realistic 3-D display is not brought up unless the real 3-D data match up with the roadmap data, i.e., unless the real 3-D data coordinate with the roadmap data. As a result, a realistic 3-D display that always looks natural is brought up.
(3) It is desirable that the real 3-D data be updated as necessary whenever the intersection arrangement changes. In other words, it is desirable to be able to update the real 3-D data freely, independently of road data update and the like. The structure adopted in the embodiment described above facilitates such an update of the real 3-D data.
(4) The real 3-D data, managed in units of individual files, can be updated with ease in correspondence to the individual files. In addition, since the files are compiled each in correspondence to a specific mesh, the real 3-D data can be updated with ease in correspondence to the individual meshes.
(5) If the road data and the real 3-D data do not match up, a message indicating a mismatch is displayed. Thus, the user is readily alerted to a data mismatch occurring even when real 3-D data are available. Namely, the user is immediately alerted to a mismatch between the current versions of roadmap and real 3-D data, which may have resulted from an update of either the road data or the real 3-D data.

Figure 9:
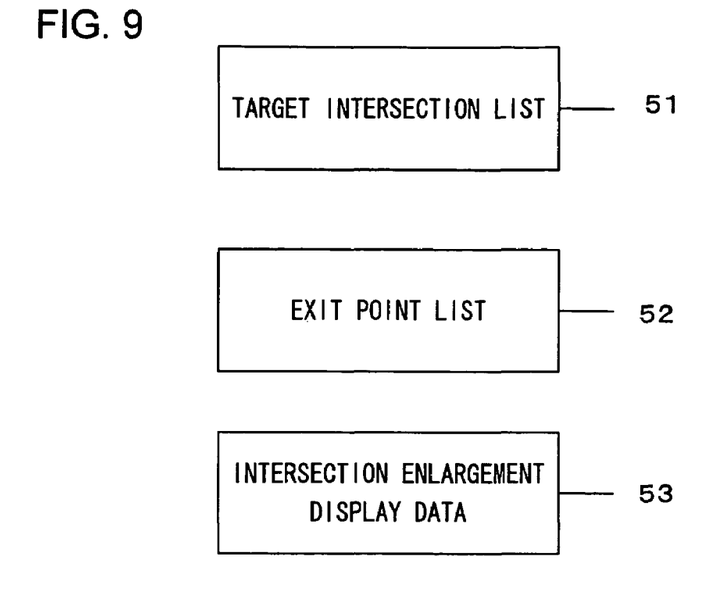
FIG. 9 shows the data structure per mesh adopted in intersection enlargement data.

While the coordination between the road data and the real 3-D data is checked in the embodiment described above, the present invention is not limited to this example and another type of data indicating intersection arrangement may be used in similar applications. For instance, intersection enlargement data or driver's view data may be used. FIG. 9 shows the data structure per mesh that may be adopted in intersection enlargement data. The intersection enlargement data, assuming data structure similar to that of the real 3-D data, are constituted with target intersection list data 51, exit point list data 52 and intersection enlargement display data 53.

Figure 10:
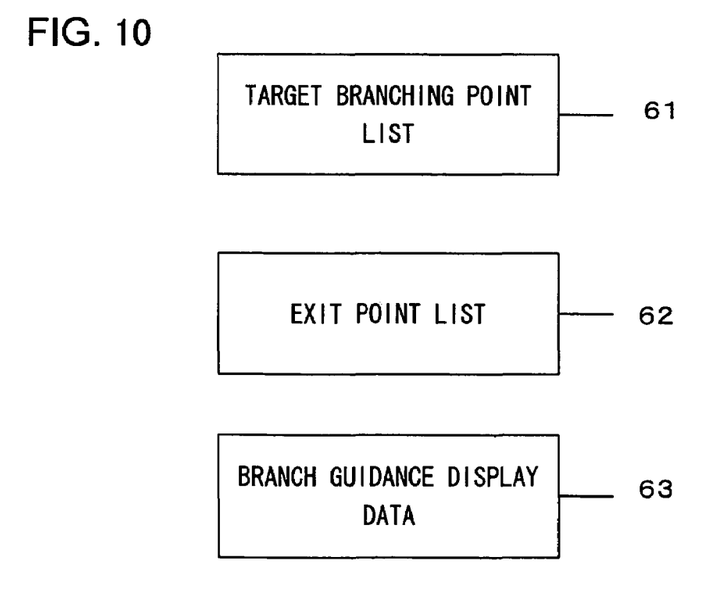
FIG. 10 shows the data structure per mesh adopted in branch guidance data.

Real 3-D data are used to indicate the intersection arrangement in the embodiment described above. The term "intersection" may be also used to refer to a branching point constituting an exit of an express highway or a toll road, or a branching point constituting an entrance to another express highway or toll road. It may also be used to refer to a branching point on a regular road constituting an entrance to an express highway or a toll road. Namely, the present invention may be adopted in conjunction with branch guidance data or junction guidance data used to provide guidance at branching points or junctions on toll roads and express highways. FIG. 10 shows the data structure per mesh that may be adopted in branch guidance data. The branch guidance data, assuming a data structure similar to that of the real 3-D data, are constituted with target branching point list data 61, exit point list data 62 and branch guidance display data 63.

While an explanation is given above in reference to the embodiment on an example achieved on the premise that the road data, the route search data and the route guidance data are updated by maintaining the required level of correspondence among them, the present invention is not limited to this example. Provided that the route guidance data assume a structure that allows them to be updated independently of the other types of data, i.e., the road data and the route search data, the present invention may be adopted in conjunction with the route guidance data as well as the real 3-D data. Namely, a decision as to whether or not the route guidance data match up with the road data or the route search data may be made as explained in reference to the embodiment.

While an explanation is given above in reference to the embodiment on an example in which a decision is made as to whether or not the road data and the real 3-D data match up by judging whether or not the target intersection list data 21 include coordinate data corresponding to the coordinates of the guidance-requiring intersection and judging whether or not the exit point list data 22 include coordinate data corresponding to the exit point coordinates, the present invention is not limited to this example. The data match up can be verified simply by judging whether or not the target intersection list data 21 include coordinate data corresponding to the coordinates of the guidance-requiring intersection.

While an explanation is given above in reference to the embodiment on an example in which a decision is made as to whether or not the road data and the real 3-D data match up by judging whether or not the exit point list data 22 include coordinate data corresponding to the coordinates of the exit points present on all the roads extending from the guidance-requiring intersection, the present invention is not limited to this example. For instance, the data match up may be verified simply by judging whether or not the exit point list data 22 include coordinate data corresponding to the coordinates of the exit point present on one of the roads extending from the guidance-requiring intersection. In such a case, it is desirable to check the coordinate data in the exit point list data 22 against the coordinates of the exit point present on the recommended route.

In addition, the coordinates at the exit points on a plurality of roads instead of the coordinates of the exit points present on all the roads extending from the guidance-requiring intersection, may be checked. Based upon the coordinates at all the exit points or at a plurality of exit points, the arrangement of the intersection can be ascertained as a pattern and the data match up can be verified through pattern recognition. In this case, the allowable error for the coordinate values at the individual exit points to be compared with the coordinate data can be increased, and the data may be judged to match up as long as they indicate patterns that substantially match each other.

While an explanation is given above in reference to the embodiment on an example in which a decision is made in step S6 in FIG. 7 as to whether or not real 3-D data are available in correspondence to the guidance-requiring intersection by referencing the route guidance data for the guidance-requiring intersection, the present invention is not limited to this example and the operation may skip step S6 to proceed directly to step S7. In other words, a decision may be made as to whether or not real 3-D data are available for the guidance-requiring intersection depending upon whether or not the target intersection list data 21 include coordinate data corresponding to the coordinates of the guidance-requiring intersection.

While an explanation is given above in reference to the embodiment on an example in which the road data and the real 3-D data are managed in units of individual meshes, the present invention is not limited to this example and they may be managed and updated in correspondence to other management units.

While an explanation is given above in reference to the embodiment on an example in which the navigation apparatus 1 and the data provider center 9 are connected via the telephone network 5, the present invention is not limited to this example and the navigation apparatus and the data provider center may be connected through another communication network (communication medium). For instance, they may be connected with each other via the Internet or via a dedicated line.

While an explanation is given above in reference to the embodiment on an example in which the update data are provided via a communication line (communication medium) in the telephone network 5, the present invention is not limited to this example. The update data may be provided in a recording medium such as a CD-ROM or a memory card.

While an explanation is given above in reference to the embodiment on an example in which the DVD drive device 14 is installed at the navigation apparatus 1, the present invention is not limited to this example. The navigation apparatus 1 may include the nonvolatile memory 12 such as a hard disk alone, and may obtain map data and search data entirely through communication. In addition, the navigation apparatus 1 may include a slot for an IC card or the like, and update data to be used to update search data may thus be provided in a removable memory such as an IC card.

While an explanation is given above in reference to the embodiment on an example in which the present invention is adopted in a navigation apparatus installed in a vehicle, the present invention is not limited to this example and may be adopted in a portable navigation apparatus. Furthermore, the present invention may be adopted in an apparatus other than a navigation apparatus. Namely, the present invention may be adopted in all types of apparatuses in which intersection arrangement data are used to display the intersection arrangement and road data are used to display a roadmap.

While the programs executed in the navigation apparatus 1 and the server 6 are already installed in the respective apparatuses in the embodiment explained above, the present invention is not limited to this example. These programs may instead be provided via recording media such as DVD or CD-ROM. In such a case, the individual apparatuses will each need to be equipped with a device that reads the data from the recording medium. Alternatively, such programs may be provided via a transmission medium such as a communication network, a typical example of which is the Internet. Namely, the programs may each be transmitted as a signal on a carrier wave that carries a transmission medium. In addition, the program to be used in the navigation apparatus 1 may be provided by the server 6 in the map data update system shown in FIG. 1.

While an explanation is given above in reference to the embodiment on an example in which the present invention is adopted in a dedicated navigation apparatus installed in a vehicle, the present invention is not limited to this example and the navigation apparatus may be embodied by executing the control program for the navigation apparatus 1 described above on a personal computer. In such a case, the current position detection device 13 and the like should be connected to specific I/O ports of the personal computer.

Figure 11:
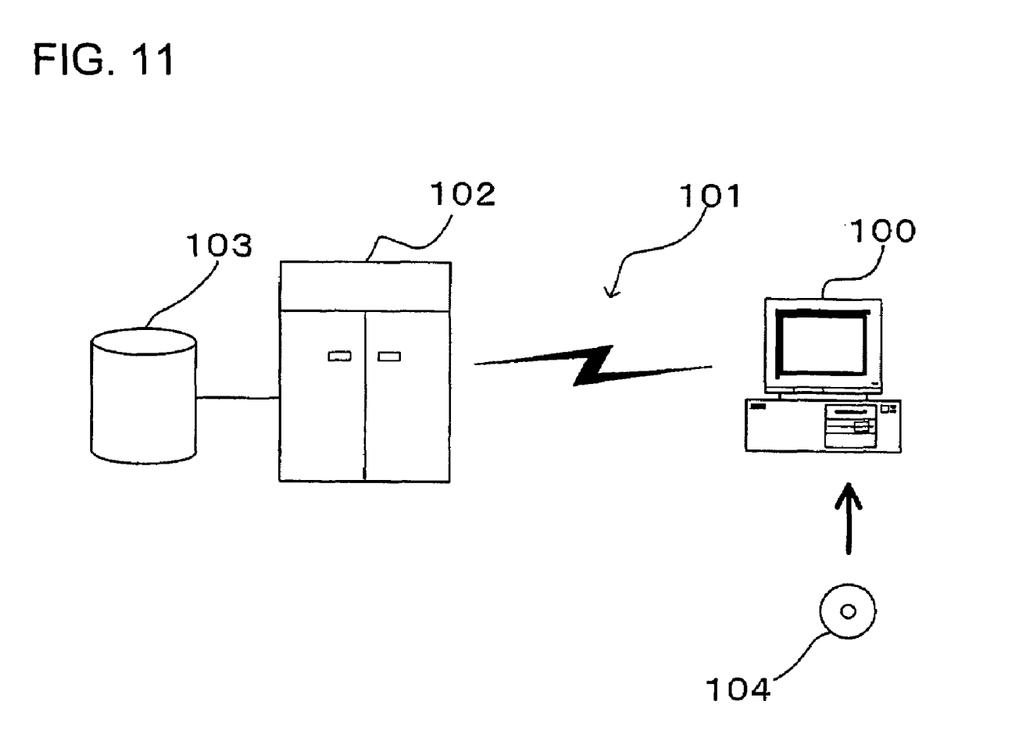

FIG. 11 shows how a program may be provided to a personal computer 100 via a recording medium such as a CD-ROM or a DVD or via a data signal on the Internet or the like, as described above. While reference numeral 100 indicates a personal computer in FIG. 11, it may indicate the navigation apparatus 1 or the server 6. The personal computer 100 obtains the program via a CD-ROM 104. In addition, the personal computer 100 is able to connect with a communication line 101. A computer 102 is a server computer that provides the program stored in a recording medium such as a hard disk 103. The communication line 101 is a communication line for achieving a connection with the Internet or it may be a dedicated communication line. The computer 102 reads out the program from the hard disk 103 and transmits the program to the personal computer 100 via the communication line 101. Namely, the program, embodied as a data signal on a carrier wave, is transmitted via the communication line 101. The program can be thus distributed as a computer readable computer program product adopting any of various modes including a recording medium and a carrier wave.

It is to be noted that the map data, the search data and update data to be used to update the map data or the search data, too, may be distributed as a computer readable computer data product adopting any of various modes including a recording medium and a carrier wave, as explained above.

The above described embodiment is an example, and various modifications can be made without departing from the spirit and scope of the present invention.

What is claimed is:

1. A navigation apparatus, comprising:
   a road data-obtaining unit that obtains road data containing coordinate information of an intersection and used to display a roadmap;
   an intersection arrangement data-obtaining unit that obtains intersection arrangement data that is independent from the road data, adopts a data structure that enables an update thereof to be executed independently of the road data, and is used to display an intersection arrangement at an intersection in a display mode different from a display mode adopted for displaying the roadmap; and
   a display control unit that displays at a display unit the roadmap by using the road data obtained by the road data-obtaining unit and displays an intersection arrangement at an intersection on the roadmap by using the intersection arrangement data obtained by the intersection arrangement data-obtaining unit, wherein:
   the intersection arrangement data include intersection coordinate data containing coordinate information corresponding to an intersection as well as display data used to display an intersection arrangement at an intersection;
   when approaching a specific intersection on the roadmap, the display control unit makes a decision as to whether or not the intersection coordinate data of the intersection arrangement data include coordinate information corresponding to coordinate information for the specific intersection on the roadmap; and
   if the intersection coordinate data are determined to include the coordinate information corresponding to the coordinate information for the specific intersection on the roadmap, the display control unit judges that the road data and the intersection arrangement data match up, and displays the intersection arrangement at the specific intersection by using the intersection arrangement data.

2. A navigation apparatus according to claim 1, wherein:
the intersection coordinate data further include specific distance point coordinate information for a point on a road extending from an intersection present at a predetermined distance from the intersection, in addition to coordinate information corresponding to the intersection;
the display control unit calculates coordinates of a point on a road extending from the specific intersection present at the predetermined distance from the specific intersection on the roadmap by using the road data and makes a decision as to whether or not the intersection coordinate data include specific distance point coordinate information corresponding to the calculated coordinates; and
if the intersection coordinate data are determined to include the specific distance point coordinate information corresponding to the calculated coordinates, the display control unit judges that the road data and the intersection arrangement data match up and displays the intersection arrangement at the specific intersection by using the intersection arrangement data.

3. A navigation apparatus according to claim 2, wherein:
the display control unit calculates coordinates of points on a plurality of roads extending from the specific intersection present at the predetermined distance from the specific intersection by using the road data and makes a decision as to whether or not the intersection coordinate data include a plurality of sets of specific distance point coordinate information corresponding to the plurality of coordinates having been calculated.

4. A navigation apparatus according to claim 1, wherein:
upon judging that the road data and the intersection arrangement data do not match up, the display control unit displays a message indicating a mismatch between the road data and the intersection arrangement data and does not display the intersection arrangement at the specific intersection by using the intersection arrangement data.

5. A navigation apparatus according to claim 2, wherein:
upon judging that the road data and the intersection arrangement data do not match up, the display control unit displays a message indicating a mismatch between the road data and the intersection arrangement data and does not display the intersection arrangement at the specific intersection by using the intersection arrangement data.

6. A navigation apparatus according to claim 3, wherein:
upon judging that the road data and the intersection arrangement data do not match up, the display control unit displays a message indicating a mismatch between the road data and the intersection arrangement data and does not display the intersection arrangement at the specific intersection by using the intersection arrangement data.

7. A navigation apparatus according to claim 1, wherein:
the intersection arrangement data are data used to display the intersection arrangement as a three-dimensional dynamic image.

8. A navigation apparatus according to claim 1, wherein:
the intersection arrangement data are intersection enlargement data used to display the intersection arrangement in detail.

9. A navigation apparatus according to claim 1, wherein:
the intersection arrangement data are branch guidance data used to display in detail conditions at a branching point at an express highway.

10. A computer-readable computer data product, comprising a recording medium having recorded therein the intersection arrangement data to be obtained by a navigation apparatus according to claim 1.

11. A navigation apparatus, comprising:
a road data-obtaining unit that obtains road data containing coordinate information of an intersection and used to display a roadmap;
an intersection arrangement data-obtaining unit that obtains intersection arrangement data that is independent from the road data, adopts a data structure that enables an update thereof to be executed independently of the road data, and is used to display an intersection arrangement at an intersection in a display mode different from a display mode adopted for displaying the roadmap; and
a display control unit that displays at a display unit the roadmap by using the road data obtained by the road data-obtaining unit and displays an intersection arrangement at an intersection on the roadmap by using the intersection arrangement data obtained by the intersection arrangement data-obtaining unit, wherein
the intersection arrangement data include intersection coordinate data containing coordinate information corresponding to an intersection as well as display data used to display an intersection arrangement at an intersection;
when approaching a specific intersection on the roadmap, the display control unit makes a decision as to whether or not the intersection coordinate data of the intersection arrangement data include coordinate information corresponding to coordinate information for the specific intersection on the roadmap; and
if the intersection coordinate data are determined to include the coordinate information corresponding to the coordinate information for the specific intersection on the roadmap, the display control unit judges that the road data and the intersection arrangement data match up, and displays the intersection arrangement at the specific intersection by using the intersection arrangement data; and
if the intersection coordinate data are determined not to include the coordinate information corresponding to the coordinate information for the specific intersection on the roadmap, the display control unit judges that the road data and the intersection arrangement data do not match up, and does not display the intersection arrangement at the specific intersection by using the intersection arrangement data.

* * * * *